(12) United States Patent
Geelen et al.

(10) Patent No.: US 8,751,152 B2
(45) Date of Patent: Jun. 10, 2014

(54) TRAFFIC DELAY INDICATION

(75) Inventors: Pieter Geelen, Amsterdam (NL); Michiel Mayer, London (NL)

(73) Assignee: TomTom International B.V., Amsterdam (NL)

(*) Notice: Subject to any disclaimer, the term of this patent is extended or adjusted under 35 U.S.C. 154(b) by 513 days.

(21) Appl. No.: 11/907,245

(22) Filed: Oct. 10, 2007

(65) Prior Publication Data

US 2008/0167804 A1 Jul. 10, 2008

Related U.S. Application Data

(60) Provisional application No. 60/879,523, filed on Jan. 10, 2007, provisional application No. 60/879,549, filed on Jan. 10, 2007, provisional application No. 60/879,553, filed on Jan. 10, 2007, provisional application No. 60/879,577, filed on Jan. 10, 2007, provisional application No. 60/879,599, filed on Jan. 10, 2007, provisional application No. 60/879,529, filed on Jan. 10, 2007, provisional application No. 60/879,601, filed on Jan. 10, 2007.

(51) Int. Cl.
*G01C 21/00* (2006.01)
*G08G 1/123* (2006.01)

(52) U.S. Cl.
USPC .................................. 701/410; 340/995.19

(58) Field of Classification Search
USPC ......... 701/200–215, 408, 410, 420, 470, 444, 701/426, 541, 454, 431; 340/539.13, 340/995.14, 995.25, 988–996
See application file for complete search history.

(56) References Cited

U.S. PATENT DOCUMENTS

| | | | |
|---|---|---|---|
| 5,612,881 A | 3/1997 | Moroto et al. |
| 5,694,122 A | 12/1997 | Nakada |
| 5,831,552 A | 11/1998 | Sogawa et al. |
| 5,864,305 A | 1/1999 | Rosenquist |
| 6,006,161 A | 12/1999 | Katou |
| 6,014,606 A | 1/2000 | Tu |
| 6,680,674 B1 | 1/2004 | Park |
| 6,760,661 B2 | 7/2004 | Klein et al. |
| 6,898,519 B1 | 5/2005 | Schilling |

(Continued)

FOREIGN PATENT DOCUMENTS

| | | |
|---|---|---|
| DE | 4445582 C1 | 3/1996 |
| DE | 10233376 A1 | 2/2004 |

(Continued)

OTHER PUBLICATIONS

International Search report issued Jan. 29, 2008 for for International Application No. PCT/EP2007/060303.

*Primary Examiner* — Muhammad Shafi

(57) ABSTRACT

A method of indicating traffic delays in a navigation system for planning a route of a vehicle is set out. The method includes the steps of receiving traffic information comprising position information of each one of a number of delay incidents, determining a position of the vehicle on a planned route, determining a relevance of each one of the delay incidents on the planned route, based on the position information of the respective delay incident and on the position of the vehicle, selecting at least one delay incident on the planned route, based on the determined relevance of the respective delay incident, and communicating information concerning the selected delay incident to a user. A computer program for performing the method is also set out.

10 Claims, 6 Drawing Sheets

(56) References Cited

U.S. PATENT DOCUMENTS

| | | |
|---|---|---|
| 6,922,629 B2 | 7/2005 | Yoshikawa et al. |
| 6,954,696 B2 | 10/2005 | Ihara et al. |
| 7,027,917 B2 | 4/2006 | Ikeda |
| 7,289,904 B2 | 10/2007 | Uyeki |
| 2003/0225508 A9 | 12/2003 | Petzold et al. |
| 2004/0204845 A1* | 10/2004 | Wong ............ 701/210 |
| 2004/0220727 A1* | 11/2004 | Adachi .......... 701/208 |
| 2006/0058950 A1 | 3/2006 | Kato et al. |
| 2006/0069500 A1 | 3/2006 | Hashizume |
| 2006/0217881 A1* | 9/2006 | Pei et al. ....... 701/208 |
| 2008/0088480 A1* | 4/2008 | Rozum et al. ....... 340/933 |

FOREIGN PATENT DOCUMENTS

| | | |
|---|---|---|
| EP | 1087359 A | 3/2001 |
| EP | 1533592 A | 5/2005 |
| JP | 6300576 A | 10/1994 |
| JP | 8128838 A | 5/1996 |
| JP | 9061179 A | 3/1997 |
| JP | 2005241519 A | 9/2005 |
| TW | 200509001 A | 3/2005 |
| TW | 200634676 A | 10/2006 |

* cited by examiner

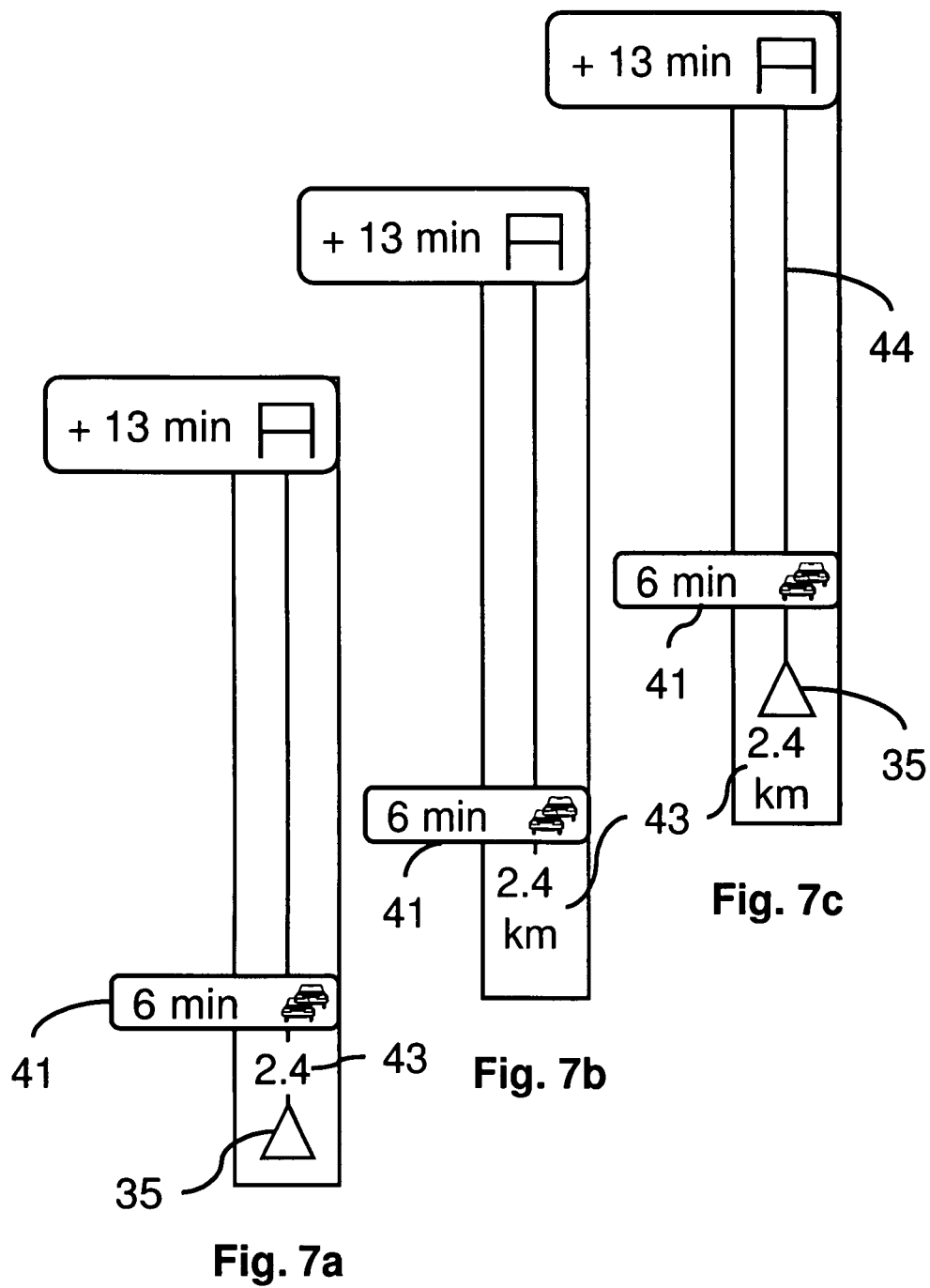

TRAFFIC DELAY INDICATION

PRIORITY STATEMENT

The present application hereby claims priority under 35 U.S.C. §119(e) on each of U.S. Provisional Patent Application Nos. 60/879,523 filed Jan. 10, 2007, 60/879,549 filed Jan. 10, 2007, 60/879,553 filed Jan. 10, 2007, 60/879,577 filed Jan. 10, 2007, 60/879,599 filed Jan. 10, 2007, 60/879, 529 filed Jan. 10, 2007, 60/879,601 filed Jan. 10, 2007, the entire contents of each of which is hereby incorporated herein by reference.

CO-PENDING APPLICATIONS

The following applications are being filed concurrently with the present application. The entire contents of each of the following applications is hereby incorporated herein by reference: A NAVIGATION DEVICE AND METHOD FOR EARLY INSTRUCTION OUTPUT (application Ser. No. 11/907,229) filed on even date herewith; A NAVIGATION DEVICE AND METHOD FOR ESTABLISHING AND USING PROFILES (application Ser. No. 11/907,230) filed on even date herewith; A NAVIGATION DEVICE AND METHOD FOR ENHANCED MAP DISPLAY (application Ser. No. 11/907,231) filed on even date herewith; A NAVIGATION DEVICE AND METHOD RELATING TO AN AUDIBLE RECOGNITION MODE (application Ser. No. 11/907,232) filed on even date herewith; NAVIGATION DEVICE AND METHOD FOR PROVIDING POINTS OF INTEREST (application Ser. No. 11/907,233) filed on even date herewith; A NAVIGATION DEVICE AND METHOD FOR FUEL PRICING DISPLAY (application Ser. No. 11/907,234) filed on even date herewith; A NAVIGATION DEVICE AND METHOD FOR INFORMATIONAL SCREEN DISPLAY (application Ser. No. 11/907,235) filed on even date herewith; A NAVIGATION DEVICE AND METHOD FOR DEALING WITH LIMITED ACCESS ROADS (application Ser. No. 11/907,243) filed on even date herewith; A NAVIGATION DEVICE AND METHOD FOR TRAVEL WARNINGS (application Ser. No. 11/907,244) filed on even date herewith; A NAVIGATION DEVICE AND METHOD FOR DRIVING BREAK WARNING (application Ser. No. 11/907,227) filed on even date herewith; A NAVIGATION DEVICE AND METHOD FOR DISPLAY OF POSITION IN TEXT READABLE FORM (application Ser. No. 11/907,241) filed on even date herewith; A NAVIGATION DEVICE AND METHOD FOR EMERGENCY SERVICE ACCESS (application Ser. No. 11/907,228) filed on even date herewith; A NAVIGATION DEVICE AND METHOD FOR PROVIDING REGIONAL TRAVEL INFORMATION IN A NAVIGATION DEVICE (application Ser. No. 11/907,240) filed on even date herewith; A NAVIGATION DEVICE AND METHOD FOR USING SPECIAL CHARACTERS IN A NAVIGATION DEVICE (application Ser. No. 11/907,239) filed on even date herewith; A NAVIGATION DEVICE AND METHOD USING A PERSONAL AREA NETWORK (application Ser. No. 11/907,238) filed on even date herewith; A NAVIGATION DEVICE AND METHOD USING A LOCATION MESSAGE (application Ser. No. 11/907,237) filed on even date herewith; A NAVIGATION DEVICE AND METHOD FOR CONSERVING POWER (application Ser. No. 11/907,236) filed on even date herewith; A NAVIGATION DEVICE AND METHOD FOR USING A TRAFFIC MESSAGE CHANNEL (application Ser. No 11/907,253) filed on even date herewith; A NAVIGATION DEVICE AND METHOD FOR USING A TRAFFIC MESSAGE CHANNEL RESOURCE (application Ser. No. 11/907,252) filed on even date herewith; A NAVIGATION DEVICE AND METHOD FOR QUICK OPTION ACCESS (application Ser. No. 11/907,251) filed on even date herewith; A NAVIGATION DEVICE AND METHOD FOR DISPLAYING A RICH CONTENT DOCUMENT (application Ser. No. 11/907,257) filed on even date herewith.

BACKGROUND OF THE INVENTION

This invention relates to a method of indicating traffic delays in a navigation system for planning a route of a vehicle, the method comprising receiving traffic information comprising position information of each one of a number of delay incidents, determining a position of the vehicle on a planned route and communicating information concerning the delay incidents to a user.

This invention further relates to a computer program product and a navigation system for performing the method of indicating traffic delays.

Nowadays, many motorists use in-car navigation systems for planning routes. Using digital maps and location information of the user, e.g. based on GPS signals received by a GPS receiver, navigation systems calculate the shortest, fastest or otherwise optimal route to a destination. One of the problems with routes planned by navigation systems is that traffic jams, road work and other delay incidents may drastically increase the time needed for reaching the destination. Some navigation systems, e.g. provided by TomTom (www.tomtom.com), are able to receive traffic information concerning the planned route and adapt the planned route in such a way that large delays are avoided. E.g., icons indicating delay incidents are shown on a map. A user may use the user interface of the navigation system to obtain further information about the delay incidents, such as the positions of the beginning or end of the delay incident, an expected delay time caused by the delay incident or a cause of the delay incident. Adaptations to the planned route may be applied automatically, after approval by the user or upon a specific user request.

It is a problem of the known traffic information services that icons on a map are only visible when the location of the corresponding delay incident is on-screen. Typically, this is only the case when the user approaches the delay incident. Relevant delay incidents that are further away may be invisible for the user. When the icon becomes visible, it may be too late to change the route and avoid the delay.

SUMMARY OF THE INVENTION

It is an object of the invention to provide a more intuitive and user-friendly way of informing the user about delays to be expected. According to a first aspect of the invention, this object is achieved by providing a method of indicating traffic delays in a navigation system for planning a route of a vehicle, the method comprising receiving traffic information comprising position information of each one of a number of delay incidents, determining a position of the vehicle on a planned route, determining a relevance of each one of the delay incidents on the planned route, based on the position information of the respective delay incident and on the position of the vehicle, selecting at least one delay incident on the planned route, based on the determined relevance of the respective delay incident, and communicating information concerning the selected delay incident to a user.

By communicating only the most relevant delay incident(s) to the user, it becomes much easier to communicate the obtained information to the user in such a way that it is easily understandable for the user, without interfering too much with the providing of the usual route information. For example, the selected delay incident(s) may be read out loud by a text-to-speech converter or may be displayed as text, graphics or a combination of both on a relatively small subsection of the display. The inventors have realized that the relevance of the delay incidents is mainly dependent on the position information of the incidents. A traffic jam situated 100 km from a current position is less relevant than another traffic jam that is only 10 km away.

In an embodiment of the method according to the invention, the traffic information further comprises an expected delay caused by each one of the number of delay incidents and the determining of the relevance of each one of the delay incidents on the planned route is further based on the expected delay caused by the respective delay incident. A one hour delay starting at 20 kilometers from the current position may be much more relevant than a 2 minutes delay that is only 2 kilometers away.

Preferably, the traffic information, the position of the vehicle and the relevance of each one of the number of delay incidents are updated periodically. After each update, new relevant delay incidents and changes to previously communicated delay incidents are communicated to the user. Furthermore, the system may remove information concerning delay incidents with a decreased relevance from the display screen.

In an embodiment of the method according to the invention, the method further comprises determining a total expected delay of all delay incidents on the planned route together and communicating the total expected delay to the user. An indication of the total amount of delay to be expected gives the user a good estimate of the duration of the delay incidents that are not selected for communication and the expected time of arrival at the destination.

Preferably, the communicating of the total expected delay comprises providing an audible warning message when the delay situation significantly changes. Traffic information may be updated very often or even almost continuously. The user should however keep an eye on the road and should not have to look at the screen of the navigation all the time to check whether something has changed in the traffic situation. If the user receives an audible message each time an interesting change or update of the traffic situation is observed, continuously watching the display is not required.

According to a second aspect of the invention, a computer program product is provided which program is operative to cause a processor to perform the method according to the invention.

According to a third aspect of the invention, a navigator system is provided for planning a route of a vehicle, the system comprising a receiver for receiving traffic information comprising position information of each one of a number of delay incidents, a memory for storing the received traffic information, a processor. The processor is arranged for determining a position of the vehicle on a planned route, determining a relevance of each one of the delay incidents on the planned route, based on the position information of the respective delay incident and on the position of the vehicle, and selecting at least one delay incident on the planned route, based on the determined relevance of the respective delay incident. The system further comprises an output for communicating information concerning the selected delay incident to a user.

BRIEF DESCRIPTION OF THE DRAWINGS

These and other aspects of the invention are apparent from and will be elucidated with reference to the embodiments described hereinafter, wherein:

FIGS. 5, 6 and 7 show examples of traffic bars for indicating traffic delays.

DETAILED DESCRIPTION OF THE INVENTION

Figure 1:
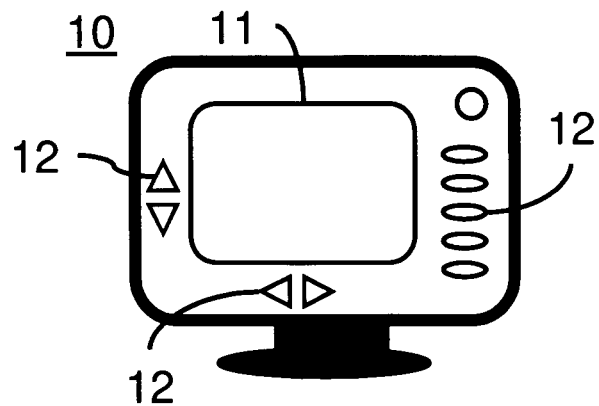
FIG. 1 shows a navigation device according to the invention.

FIG. 1 shows a navigation device 10 according to the invention. The navigation device 10 comprises a display 11 for showing, e.g., route information and traffic information. The navigation device 10 further comprises a set of interface elements 12 for enabling the user to interact with the navigation device 10. Preferably, the display 11 is a touch-screen display and the user interface of the navigation device 10 is, at least in part, embodied by menus shown and operated on the touch-screen. The navigation device 10 may use voice recognition for receiving control commands from the user. Preferably, the navigation device uses text-to-speech conversion to inform the user about, the planned route, traffic information or other information via audible messages.

Figure 2:
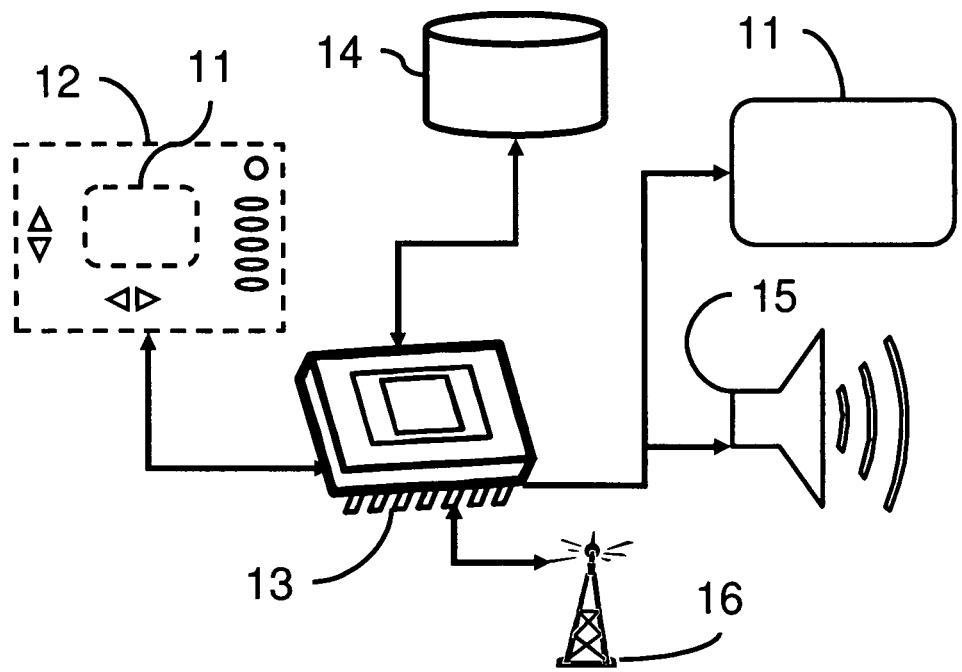
FIG. 2 schematically shows components of the navigation device of FIG. 1.

FIG. 2 schematically shows components of the navigation device 10 of FIG. 1. The navigation device comprises a processor 13 for controlling the functioning of the navigation device 10. The processor 13 is arranged to process input data from, e.g., the user, GPS satellites and traffic delay information services to calculate an optimal route for the user to travel to a destination. The processor 13 is coupled to the user interface 11, 12 for receiving instructions from the user and coupled to the display 11 for showing, e.g., planned routes, traffic information and user interface options. The processor 13 is also coupled to a memory 14 for storing software and data. The software is used by the processor to perform all functions of the navigation device 10. The data comprises, e.g., destinations, map data, user information, graphics and sound data. A speaker 15 is coupled to the processor 13 for providing audible messages. The navigation device 10 may comprise several communication units 16, all coupled to the processor 13. Generally, a navigation device 10 comprises a GPS sensor for determining a current position of the navigation device 10. Other suitable techniques may be used as an alternative or additionally, e.g., using information derived from cell based wireless communication systems, such as GSM, UMTS, GPRS, WiFi or WiMAX. Traffic information may, be obtained from a traffic information source via, e.g., AM or FM radio communication, dedicated satellite systems, mobile telephone communication networks (e.g. GSM, UMTS, GPRS) or via a nearby telephone or computer via local communication means, such as Bluetooth or USB. With the components described above, the navigation device 10 is suitable for performing the method according to the invention. It is however to be noted, that amendments or additions may be made without decreasing the suitability for performing the method according to the invention.

Figure 3:
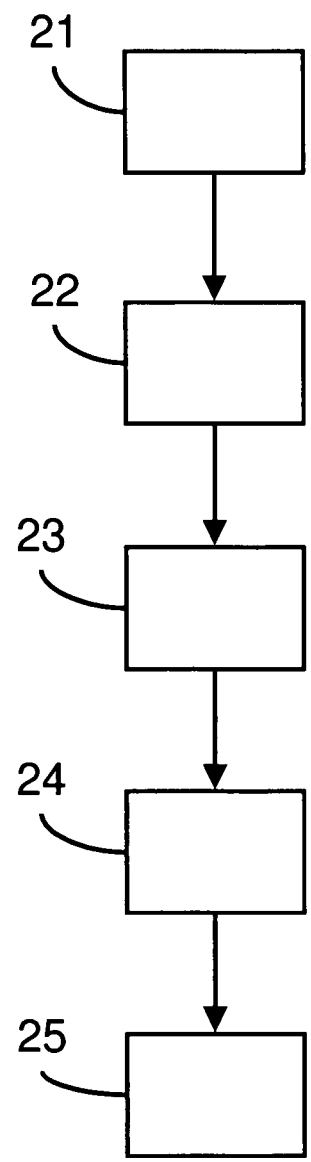
FIG. 3 shows a flow diagram of the method according to the invention.

FIG. 3, shows a flow diagram of the method according to the invention. The method according to the invention may be performed while the vehicle is traversing a planned route. The method starts with a receiving step 21 for receiving traffic information. The traffic information comprises position information of a number of delay incidents, the traffic information may also comprise additional information about the delay incidents, such as delay type (e.g., road block, accident, road work, slow moving traffic, rush hour), expected delay, trend (e.g. growing or shrinking) or other additional information, such as a moment of last update of the information. Generally, the navigation device 10 will receive all traffic information available for a large area, e.g. for the whole country or state or even for multiple nearby countries or states. However, on request, the area covered by the traffic information may be reduced in dependence of the planned route or the position of the vehicle.

In a position determining step 22, the position of the vehicle on the planned route is determined. Generally, a navigation device 10 comprises a GPS sensor for determining a current position of the navigation device 10. Other suitable techniques may be used as an alternative or additionally, e.g., using information derived from cell based wireless communication systems, such as GSM, UMTS, GPRS, WiFi or WiMAX.

Then in relevance determining step 23, the relevance of each one of the delay incidents on the planned route. All traffic information received in the receiving step 21 is filtered in order to select the delay incidents that are on the planned routes. For all delay incidents on the planned route, a relevance value is calculated. Amongst others, the relevance value is based on the current vehicle position and position information of the delay incident. If, e.g., the delay incident is only a few kilometers away from the current vehicle position, the incident is very relevant and will obtain a high relevance value. If the delay incident is 200 kilometers away, it may already have been disappeared once the vehicle reaches the position of the delay incident. Such an incident thus is much less relevant and will get a lower relevance value. The relevance value may further based on an expected delay caused by the delay incident. A one hour delay is more relevant than a 3 minutes delay. Preferably, the relevance value is based on a combination of its position and its associated expected delay. For example, a 3 minutes delay that is a few kilometers away may be more relevant than a 10 minutes delay in about 200 kilometers, and a one hour delay that is 20 kilometers away may be more important than a 3 minutes delay around the next corner.

Examples of other criteria that may influence the relevance value are delay type (e.g., road block, accident, road work, slow moving traffic, rush hour), expected delay, trend (e.g. growing or shrinking) or other additional information, such as a moment of last update of the information. Preferably, all criteria work together. For example, a one hour delay caused by a rush hour traffic jam that is 300 km away, may not be very relevant. However, a tunnel that has been closed for a few days and is 500 km away is a relevant delay incident.

After determining the relevance values of all delay incidents on the route, one or more delay incidents are selected for communicating to the user in selection step 24. Only the selected incidents are communicated to the user in communication step 25. When only informing the user about the most relevant delay incidents, the user will not be annoyed by less relevant information. Communicating delay incidents may be performed by showing graphics or text on the display 11 and/or by providing the information as spoken text via a speaker 15. When only displaying the most relevant incidents, a larger part of the display remains available for displaying maps, route information and other information.

In an embodiment of the method according to the invention, selection of delay incidents depends on a combination of the distance to and delay caused by the delay incident. The most relevant delay incidents are nearby and cause a long delay. The least relevant delay incidents are far away and cause a short delay. For each possible incident distance, there is may be minimum delay that makes the incident relevant. On the other hand, for each possible delay, there may be a maximum distance making the delay incident relevant. A selection algorithm may, e.g., select delay incidents for communicating to the user in the following manner:

If there is only one incident on the route, it is never hidden (an incident is hidden when its relevance value is below a predetermined limit).

If the distance to an incident is shorter than 15 km it is never hidden.

Figure 4:
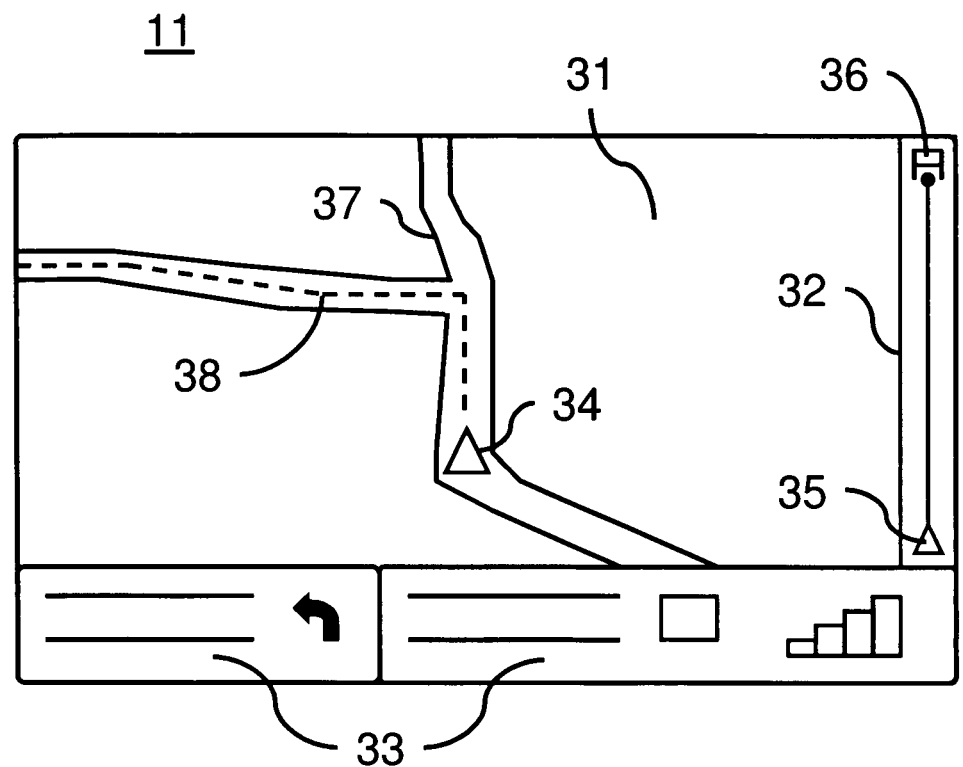
FIG. 4 shows an exemplary view of a display of the navigation device.

Delay 0-30 sec. ⇒ incident is hidden if distance>7 km
Delay 31-90 sec. ⇒ incident is hidden if distance>15 km
Delay 1-2 min. ⇒ incident is hidden if distance>30 km
Delay 2-3 min. ⇒ incident is hidden if distance>45 km
Delay 3-4 min. ⇒ incident is hidden if distance>60 km
Delay 4-5 min. ⇒ incident is hidden if distance>75 km
Delay 5-10 min. ⇒ incident is hidden if distance>150 km
Delay 10-15 min. ⇒ incident is hidden if distance>200 km
Delay 15-20 min. ⇒ incident is hidden if distance>250 km
Delay 20-30 min. ⇒ incident is hidden if distance>300 km
Delay >30 min. ⇒ incident is never hidden FIG. 4 shows an exemplary view of a display 11 of the navigation device 10. The display 11 shows a map 31 with one or more roads 37. An indicator 34 represents the current position of the vehicle on the map 11. Part of the roads 37 on the map 11 are highlighted for indicating the route 38 that is advised to the user. An information panel 33 may provide the route information in another form, e.g. using text and arrows. The information panel 33 may also show additional information, such as e.g. battery power and display options. In this embodiment, a traffic bar 32 is used for indicating traffic information. A skilled person will be able to use other ways of displaying traffic information on screen. The traffic bar 32 comprises a vehicle icon 35, representing the current position of the vehicle. Preferably the same icon is used as for the indicator 34 on the map 31, making it easier for the user to understand the vehicle icon 35. When a new route is planned and the vehicle has not yet started traveling, the vehicle icon may be replaced by a Go flag that represents the start location of the route. A finish icon 36 represents the destination. The same icon may be used for representing the destination on the map 31. A line extending from the vehicle icon 35, to the finish icon 36 represents the planned route. Representations of the delay incidents on the route are placed on the line. In the situation of FIG. 3 however, no delay incidents are reported. In the following figures, traffic bars 32 are shown, comprising one or more delay incidents. It is to be noted that when no delay incident is expected, the traffic bar 32 may be hidden completely.

Figure 5:
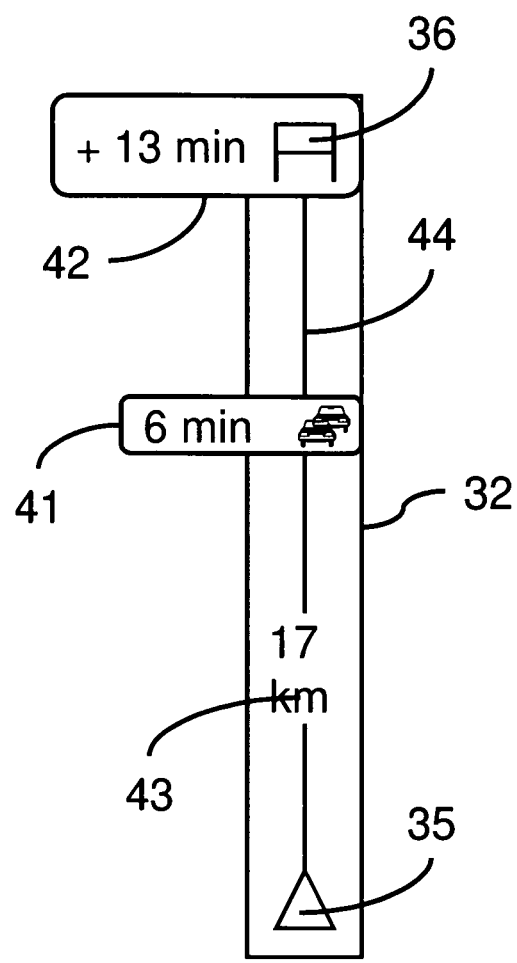
Figure 6:
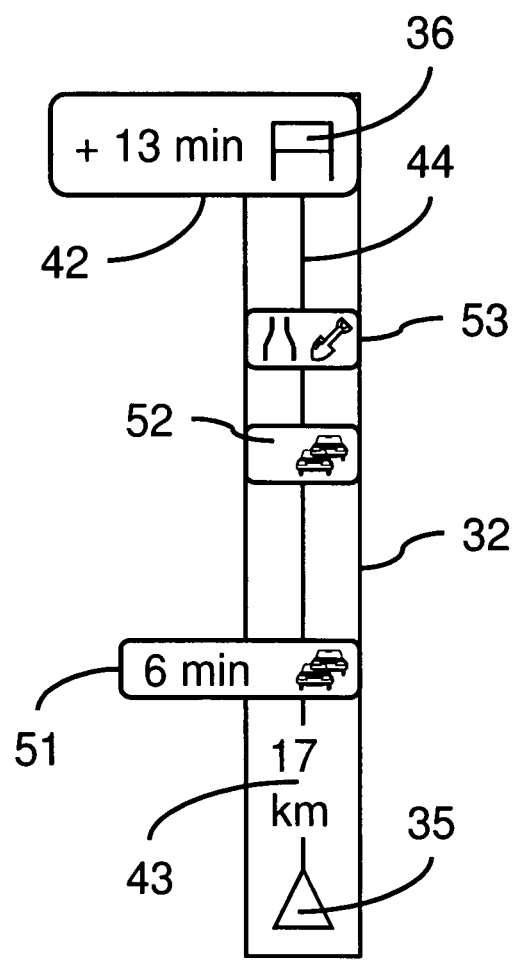

FIGS. 5, 6 and 7 show examples of traffic bars 32 for indicating traffic delays. In FIG. 5, only the most relevant delay incident 41 is shown. The shown delay incident is traffic jam, causing a 6 minutes delay and starting 17 km from the current position of the vehicle. A distance indicator 43, indicates the distance from the vehicle to the first relevant delay incident 41. The position of the selected delay incident 41 on the traffic bar 32 is proportional to the distance from the vehicle and the destination. The route indicator 44 represents the distance between the vehicle and the destination. When a delay incident is, e.g., half way between the vehicle and the destination, the delay incident 41 is shown halfway the route indicator 44. As the vehicle approaches the delay incident, the route represented by the route indicator 44 becomes shorter and the delay incidents slides down towards the vehicle icon.

When the vehicle has passed the selected delay incident 41, the next most relevant delay incident may be shown. In this example, the scale of the route indicator is linear, however other options are also available. The scale may, e.g., also be logarithmic. As an option, the scale of the traffic bar 32 may be indicated by numbers displayed along the traffic bar and indicating the distance from the vehicle.

Optionally, the length of the traffic bar may be limited to only represent the area for which traffic information is available and parts of the route for which traffic information is not available may not be shown. In the event that the traffic information is not up to date anymore, e.g., because of connection problems, the traffic bar may be 'greyed out', i.e. shown in a different color.

A total expected delay indicator 42 at the top of the traffic bar 32 indicates the total delay to be expected. The fact that the total expected delay indicator 42 is put next to the finish icon 36, will make it more obvious to the user that it deals with a total delay, since they are likely to put a connection between the end of the route and the total delay they encountered along this route. This will increase usability. An advantage of the plus sign shown in the total expected delay icon 42 is put in front of the number to indicate that this number indicates the total delay, and not a delay of one of the incidents on the route. It is to be noted that the total expected delay icon 42 may, of course, also be embodied in alternative ways. The total delay is the sum of the expected delays of all delay incidents on the route. In FIG. 5, the total delay is 13 minutes. The only incident 41 selected for display causes a 6 minutes delay. Other delay incidents that are further away and/or cause less delay are not selected for display. The delay incidents that are not shown together cause a delay of 7 minutes The traffic information is updated periodically, which may cause the displayed information to be changed. Preferably, a warning message is provided if the total expected delay is changed more than a predetermined amount of time. For example, an increase of the total expected delay to 14 minutes will not cause a warning message, but when the total expected delay becomes more than 18 minutes, a warning message is provided. Preferably, the warning message is provided as an audible signal, making it unnecessary for the user to repeatedly check the display. The user may then keep his eyes on the road which improves safety. Most preferably, the warning message is provided using text-to-speech conversion and comprises the updated total expected delay. This message may also contain a question for the user, if he wishes to optimize the route. If the device supports voice recognition, the user may answer the question without needing to let go the steering wheel.

In FIG. 6, not only the most relevant, but also some other relevant delay incidents are shown. The first relevant delay incident 51 is similar to the most relevant delay incident 41 in FIG. 5. Again, the incident distance indicator 43 shows the distance between the vehicle and the first relevant incident 51. Two other relevant delay incident 52, 53 are also selected for display on the traffic bar 32. The second relevant delay incident 52 is also a traffic jam. The third delay incident 53 is a road narrowing because of road work. In this example, the specific delays expected for these further incidents 52, 53 is not shown, because it is determined to be less relevant. However, in an alternative embodiment, the expected delays for these incidents may also be shown.

FIGS. 7a, 7b and 7c show three different ways to solve the problem that the distance indicator 43, may be too large to fit between the first relevant delay incident 41 and the vehicle icon 35. In FIG. 7a this problem is solved by making the distance indicator 43 smaller. In FIG. 7b, the distance indicator 43 slides over the vehicle icon 35 and the vehicle icon 35 is not visible anymore. In FIG. 7c, the route indicator 44 has been made smaller and the distance indicator 43 is displayed below the vehicle icon 35.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. A navigation system to plan a route of a vehicle, the system comprising:
a receiver configured to receive traffic information including position information associated with a plurality of delay incidents and an expected delay caused by each one of the number of delay incidents,
a memory configured to store the received traffic information, one or more processors arranged to,
filter said received traffic information to select one or more delay incidents that are on a planned route,
determine a position of the vehicle on the planned route, and
process each one of the delay incidents on the planned route to select at least one of the delay incidents as a relevant delay incident, said processing comprising determining if the distance to the respective delay incident along the planned route from a position of the vehicle is less than a predetermined distance and the expected delay caused by the respective delay incident is greater than a predetermined time, and
an output configured to graphically display map data associated with the planned route and configured to simultaneously display a linear traffic bar displaying a graphic representation associated with the at least one relevant delay incident to a user, the graphic representation being at a linear position along the traffic bar and proportional to the position of the at least one relevant delay incident on the planned route as compared to the position of the vehicle and a destination on the planned route.

2. The system to plan a route of a vehicle as claimed in claim 1, wherein the traffic information includes a delay type of each one of the one or more relevant delay incidents.

3. The system to plan a route of a vehicle as claimed in claim 1, wherein the linear traffic bar includes a representation of the expected delay caused by the one or more selected relevant delay incidents.

4. The system to plan a route of a vehicle as claimed in claim 1, wherein the processor further determines a total expected delay of all the relevant delay incidents on the planned route, and the linear traffic bar displays the total expected delay to the user.

5. The system to plan a route of a vehicle as claimed in claim 4, wherein the processor periodically checks the updated traffic information and the total expected delay, and the output communicates the updated total expected delay on the linear traffic bar, and provides an audible warning message if a criterion is met.

6. The system to plan a route of a vehicle as claimed in claim 5, wherein the processor decides that the criterion is met, since a previous warning message, when the total expected delay has resulted in an increase of the total expected delay with more than a first amount of time.

7. The system to plan a route of a vehicle as claimed in claim 5, wherein the processor is configured to decide that the criterion is met when the previous warning message has been provided more than a second amount of time ago.

8. The system to plan a route of a vehicle as claimed in claim 5, wherein the audible warning message is generated using text to speech conversion.

9. A non-transitory computer readable medium which stores a set of instructions which when executed performs a method of indicating traffic delays in a navigation system for planning a route of a vehicle, the method executed by the set of instructions comprising:
receiving traffic information including position information of each one of a number of delay incidents and an expected delay caused by each one of the number of delay incidents,
filtering the received traffic information to select delay incidents that are on a planned route;
determining a position of a vehicle on a planned route,
processing each one of the delay incidents on the planned route to select at least one of the delay incidents as a relevant delay incident, said processing comprising determining if the distance to the respective delay incident along the planned route from the position of the vehicle is less than a predetermined distance and the expected delay caused by the respective delay incident is greater than a predetermined time, and
generating display map data associated with the planned route to graphically display on a display and configured to generate a graphic representation associated with the selected delay incident to graphically display on the display the graphic representation being at a linear position along the traffic bar and proportional to the position of the relevant delay incident as compared to the position of the vehicle and a destination.

10. A method of indicating traffic delays in a navigation system for planning a route of a vehicle, the method comprising:
receiving, by a receiver, traffic information including position information of each one of a number of delay incidents and an expected delay caused by each one of the number of delay incidents;
filtering said received traffic information to select delay incidents that are on a planned route;
storing, by a memory, the received traffic information;
determining, by a processor, a position of the vehicle on the planned route;
processing each one of the delay incidents on the planned route to select at least one of the delay incidents as a relevant delay incident, said processing comprising determining if the distance to the respective delay incident along the planned route from the position of the vehicle is less than a predetermined distance and the expected delay caused by the respective delay incident is greater than a predetermined time;
generating a display map data associated with the planned route to graphically display on a display; and
generating a graphic representation associated with the selected at least one delay incident to graphically display on the display, the graphic representation being at a linear position along the traffic bar and proportional to the position of the at least one delay incident as compared to the position of the vehicle and a destination.

* * * * *